United States Patent [19]
Ericson et al.

[11] 3,972,108
[45] Aug. 3, 1976

[54] METHOD OF MAKING MATERIAL FOR HARD FACING

[75] Inventors: Lars Torsten Ericson; Lars Gosta Ljungström; Gustaf Henrik Widmark, all of Sandviken, Sweden

[73] Assignee: Sandvik Aktiebolag, Sandviken, Sweden

[22] Filed: Aug. 26, 1975

[21] Appl. No.: 608,009

[30] Foreign Application Priority Data
Aug. 30, 1974 Sweden.............................. 7410979

[52] U.S. Cl. .............................................. 29/420.5
[51] Int. Cl.[2] ............................................ B22F 3/00
[58] Field of Search............................ 29/420, 420.5

[56] References Cited
UNITED STATES PATENTS

| | | | |
|---|---|---|---|
| 3,733,678 | 5/1973 | Wessel................................ | 29/420.5 |
| 3,746,518 | 7/1973 | Holtz, Jr. ....................... | 29/420.5 X |
| 3,834,002 | 9/1974 | Sissons et al....................... | 29/420.5 |

*Primary Examiner*—Milton S. Mehr
*Attorney, Agent, or Firm*—Pierce, Scheffler & Parker

[57] ABSTRACT

For producing a welding electrode for hard-facing, a carbide or sigma-phase pre-alloy is very finely subdivided, mixed with carbon and/or cobalt, compressed to a coherent mass, heat-treated out of access to air and extruded to wire or strip.

9 Claims, No Drawings

METHOD OF MAKING MATERIAL FOR HARD FACING

The present invention relates to a method of manufacturing welding electrodes or similar products to be used in hard-facing, i.e. applying hard surface layers on different substrates. The invention method is applied to a hard-facing material which is normally completely unworkable in hot as well as in cold condition. According to the invention, however, the material is given such a good ductility that it can be used or manufactured in the shape of a wire, strip or the like for automatic welding (i.e., being used to a continuous electrode) without any difficulty.

It heretofore was known that the working life of parts or surfaces being exposed to impact stresses, wear, abrasion, corrosion, etc., could be increased by means of surface coating or hard-facing. Practically all steels can be hard-faced by arc welding. In order to obtain maximum results, however, the substrate should be low-alloyed and suitable for welding.

Among hard-facing materials, which are particularly resistant to wear and impact stresses are those alloys in which a hard carbide phase is dispersed or very finely divided in a softer metal matrix. Materials in which the hard phase consists essentially of carbides of tungsten and chromium, and the matrix consists mainly of cobalt - are of particular importance. The present invention relates to the mentioned kind of material and, in particular, to a hard alloy whose composition is (in percentage by weight) 0.05 – 5.0 % C, 5 – 35 % Cr, 0.5 – 20 % W and the remainder Co besides normally present impurities. The mentioned hard alloy thus relates to material of the "stellite" type, having a composition of, in particular, 0.5 – 3.0 % C; 25 – 35 % and preferably 27 – 31 % Cr; 1 – 15 % and preferably 3 – 13 % W and the remainder Co, which means preferably 54 – 69 % Co (all components calculated in % by weight). As examples there may be mentioned "Haynes Stellite" 1.6 respectively 12 consisting of so-called "23-carbide" of C—Cr—Co=W in a matrix of Co and having the following nominal analysis (in % by weight):

|   | C | Cr | W | Co |
| --- | --- | --- | --- | --- |
| "Haynes Stellite 1" | 2.5 | 30 | 12 | 55.5 |
| "Haynes Stellite 6" | 1.0 | 28 | 4 | 67 |
| "Haynes Stellite 12" | 1.25 | 29 | 8 | 61.75 |

Because the mentioned alloy is completely unworkable in hot as well as in cold condition, electrodes for hard-facing have, up to now, had to be cast in suitable dimensions, usually in lengths of about 0.35 meters and diameters of about 3 – 6 millimeters. Even if greater lengths — 1.8 – 2.4 meters — have been reported, these cast electrodes suffer from complete lack of ductility in cold condition. These facts mean certain manufacturing difficulties but the most important disadvantage is that the material cannot be used for automatic hard-facing, which needs a continuous and ductile electrode. In this operation there are often so high requirements upon flexibility or ductility of the electrode that it could be coiled into many turns of winding.

The method of the present invention provides an acceptable solution of the mentioned problems and results in a welding electrode having satisfactory ductility and being very suitable for use in automatic hard-facing. It means that the same kind of material will be obtained in the hard layer after the welding as it would be in the alloy manufactured in the normal way by melting and casting. Thus, the desired structure and the other benefits and positive properties of the alloy will not be changed or impaired.

The invented procedure comprises a combination of process steps within the fields of melting metallurgy, powder metallurgy and working, the steps being known per se but not applied in the electrode field.

As an example of known technique may be mentioned manufacturing of welding electrodes solely from powder by means of pressing and sintering followed by working to final dimension. Such a method could not generally be applied in the present case, however, because a complete sintering of the actual alloy would inherently cause insufficient ductility for a following deformation. Furthermore, the finished product would have completely unsatisfactory ductility for the same reason.

As another example of prior technique may be mentioned welding electrodes consisting of a tubular outer metal sheath and an inner core of metal powder. In cases where such electrodes are used for hard-facing, the core often consists of hard carbide grains of hard metal, i.e. hard principles and binder metal, which have been sintered and crushed. Also this kind of electrode would not be satisfactory in the present case, however. In working, welding etc. of "stellite" material or the like, the core of the electrode must thus be homogeneous and relatively free of pores. Otherwise, difficulties during the welding because of internal oxidation, non-uniform temperature distribution or other reasons could not be avoided.

Finally, it may be mentioned that methods of manufacturing "stellite" alloys by powder metallurgy were previously known per se. In these methods there have been used pre-alloys — based on cobalt and chromium — of essentially σ (sigma)-phase-type, which have been crushed and mixed with desired alloying or base elements. Then, the powder mixtures have been pressed or compacted and finally sintered at high temperature, usually above 1200° C., to a final product. The described method does not give any object, however, which would be suitable for electrodes in automatic welding or which could preferably be further worked to such products. The final sintering at a relatively high temperature means a material which has somewhat better ductility than normal cast "stellite", but nevertheless is too hard or unworkable to be used as a continuous welding wire.

The method according to the invention is characterized essentially in that all hard principals, or elements forming such hard principals, are isolated in one or more brittle, easily crushed phases, alloys or compounds. These are prepared by means of melting and casting, after which the obtained product is finely divided into powder. The softer metallic matrix — being essentially Co or a Co-alloy (for example Co alloyed with 1.5 – 3.5 % Ti to increase the deformability in case of cold drawing or cold milling) — is then mixed with the aforesaid hard substance. It is often advantageous to have as large amounts of free matrix metal binder as possible in the powder mixture in order to obtain maximum workability and ductility. (A certain amount of this metal binder, as Co, is often a part of the easily crushed hard principle phases.) After that, the powder is compacted (in cold condition), and is then heated up to a relatively moderate temperature followed by hot working which suitably may include extrusion. Then possible reducing working operations, preferably rolling hot and/or cold may be used in order to obtain final dimension, being usually round or flat section. By eliminating the casting step of the hard alloy — or rather moving this step forward to a later melting down — and instead keep the hard principles in a relatively "weakly bonded condition" in a ductile matrix — it has been possible to obtain a product which has a satisfactory availability in automatic welding, being used in form of a wire, a strip or equivalent form.

The method is characterized in that one or more brittle and easily crushed pre-alloys are manufactured preferably in melt-metallurgical ways. Said pre-alloys consist of carbide and/or σ (sigma)-phase containing those amounts or contents of Cr and W which are to be found in the final hard alloy. In the sigma-phase there are also essential amounts of Co and sometimes also C. Also the carbide or carbides contain naturally C.

The brittle, easily crushed, pre-alloys of sigma-phase type, which have been found suitable, normally have a composition consisting essentially of 45 – 65 % Cr; 0.5 – 20 % W; and 20 – 50 % Co. Particularly advantageous grades have had the composition: 50 – 60 % Cr; 4 – 12 % W; and 30 – 40 % Co. As examples of such alloys may be mentioned: 56 Cr – 8W – 36 Co, and 54 Cr – 12 W – 34 Co. Also C-containing variants have shown to be suitable, an example being 56 Cr – 8W – 34 Co – 2C.

Among carbides which have been found easily crushed and suitable to use alone or together with σ-phase may be mentioned chromium carbide consisting essentially of 85 – 95 % Cr and 5 – 15 % C, for example $Cr_7C_3$ (91 % Cr; 9 % C), and mixed carbides of Cr and W, for example $(Cr, W)_{23}C_6$ (85 % Cr; 12 % W; 3 % C).

After finely dividing the pre-alloy, by crushing, milling or the like to powder, any wanted amounts of C and/or Co are added or mingled, the resulting powder mixture then being compacted, preferably by pressing at room temperature to a coherent mass or body. Through a selective choice of powders, the particles in this case being essentially of spherical shape, it is also possible to exclude the cold compaction step, as a relative density sufficient for successful hot compaction by extrusion can be reached without any precompaction steps.

After the possible compaction there is normally a heat treatment of the green bodies at about 700° – 900° C. in a protective atmosphere, in which operation the lubricant used in the compaction will escape and an improved strength of the green body will be obtained.

After that, further compaction and/or diameter-reduction is done in hot condition by means of hot working, suitably extrusion. In this process step, pressed and heat-treated bodies (or possibly uncompacted powders) are enclosed in metal sheaths, which are evacuated and sealed, the material thus being protected from oxidation during the heating. In this way, also, suitable billets for further hot working and related treatments are obtained. After heating of the billet to a temperature below 1200° and usually at 1050°–1175° C. the hot working is done, preferably as an extrusion, normally being completed by a following rolling or forging. In this way a final product can often be immediately obtained. A certain cold working by means of rolling, drawing etc. — which does not essentially change the ductility of the product — can in certain cases be suitable as a final step, as well as other kinds of working and/or heat treating. The cold working may be facilitated if the Co-matrix is alloyed, for example with 1.5 – 3.5 % Ti.

The invented method is thus characterized in, that the compaction and/or the working of the initial powder to the desired product, i.e. the welding wire, is done under such conditions that satisfactory density, homogenity and structure can be obtained in the material. At the same time, the welding wire will obtain desired ductility or flexibility. This is reached (1) by means of a very fine dividing of the powders, often a milling down to mean grain sizes between 0.2 – 20 % $\mu$, usually 0.3 – 10 $\mu$, and (2) by a rigorous control of the process conditions used. The temperature of the hot working or hot compaction should thus be chosen within a relatively restricted range. By this measure it is possible to reach satisfactory hot workability and density of the material while avoiding the production of such a hard sintered product that its workability or ductility is impaired. Such a temperature range has often shown to be 1100°–1150° C. Impaired workability is essentially caused by a diffusion of alloying elements into the matrix, said elements being present in the σ-(sigma) phase or in the carbides.

As was earlier mentioned, it has often been found advantageous to adjust the composition of the initial powders so that as large part as possible, or the whole part, of the ductile matrix, i.e. usually Co, is separate in the mixture. In the last-mentioned case, the hard substances may be mixed carbides of Cr and W, which do not contain Co. Such carbides have normally a composition of: 0.05 – 15 %, preferably 1–10 % C; 75 – 95 %, preferably 80 – 90 % Cr, and 0.5 – 20 % preferably 8 – 16 % W. As an example of such an easily crushed carbide composition may be mentioned: 85 Cr–12W–3C.

The following example describes the preparation of a continuous electrode for automatic welding by means of the method according to the invention. The electrode consisted of a material of the "stellite" type having a Cr:W ratio of about 7:1 and a content of Co being above 65%.

An easily crushed mixed carbide of Cr and W, a so-called "23-carbide", with the formula $(Cr, W)_{23}C_6$, was prepared by means of melting the metal components together with carbon (coal) in an electrically heated furnace. The resulting mixed carbide, which had a face-centered cubic crystal structure (FCC) with the lattice parameter 10.70 A (Angstrom) was crushed to a mean grain size of 0.5 – 2 $\mu$ and mixed with the wanting amount of Co powder and pressing lubricant in connection with the mentioned milling. After drying of the powder, there was effected a pressing of bodies in the form of plates or cylinders having a diameter of about 50 millimeters. The so-formed green bodies were then heat-treated at 800° C. in a protective atmosphere, after which a number of bodies were enclosed in a tubular container of steel having a wall thickness of about 3 millimeters. After evacuating the container from enclosed air, etc., the outer sheath was sealed. The billet so obtained was then heated up to about 1100° C. and extruded to a bar having a diameter of about 13 millimeters. By means of hot rolling, in which said bar or billet was heated to a temperature between 1125°–1150°C., there was effected a further working of the material down to the desired wire dimension, $\phi = 5$ millimeters. The wire was tested in hard-facing of steel in the form of automatic welding and showed a satisfactory, desirable, ductility and flexibility. The welding could be done without interruptions and the result proved uniform and well adhering surface layers of a hard alloy, which had the characteristic solidifying structure of the corresponding cast alloy. In the welding there had thus been a melting and a complete mixing of the alloying elements. The obtained hardfacing layer was characterized by an extreme fine-dividing or dispersion of Cr- and W-carbides in a matrix of Co.

We claim:

1. Method of making a welding electrode in the shape of a wire or strip for automatic hard facing, in which the electrode material consists of a hard alloy containing 0.05 – 5.0 % C, 5 – 35 % Cr, 0.5 – 20 % W and the remainder essentially Co besides normally present impurities, which method comprises preparing a body of a brittle, easily crushed pre-alloy consisting of carbide and/or sigma-phase by melt-metallurgical means, the pre-alloy containing the contents of Cr and W of the final hard alloy besides essential amounts of C and/or Co; finely dividing the prepared pre-alloy into a powder; thereupon adding any missing amount of C and/or Co; compacting the so-prepared powder into a coherent mass; and finally working the mass into a ductile, workable product.

2. Method defined in claim 1, in which the final working of the mass of compacted powder includes hot working at a temperature below 1200° C.

3. Method defined in claim 2, wherein the compression of the powder involves pressing or cold compaction to a body; heat-treating the body at a temperature between 700°–900° C. in a protective atmosphere; thereafter enclosing the heat-treated body in an outer sheath of metal and warm-compacting the sheathed body by means of extrusion, rolling or the like at a temperature between 1050° and 1175° C.

4. Method defined in claim 1, wherein the easily crushed pre-alloy consists essentially of $\sigma$ (sigma)-phase composed of 45 – 65 % Cr, 0.5 – 15 % W and 20 – 50 % Co.

5. Method defined in claim 1, wherein the easily crushed pre-alloy consists essentially of a mixed carbide composed of 1 – 10 % C, 80 – 90 % Cr and 8 – 16 % W.

6. Method defined in claim 1, wherein the easily crushed pre-alloy consists essentially of chromium carbide composed of 85 – 95 % Cr and 5 – 15 % C.

7. Method defined in claim 1, in which subdivision of the prepared pre-alloy includes milling to a mean grain size between 0.2 – 20 $\mu$, preferably 0.3 – 10 $\mu$.

8. Method defined in claim 2, in which the hot working step is effected out of access of air.

9. Method defined in claim 8, in which the hot-worked material is extruded to wire or strip form.

* * * * *